(12) United States Patent
Wilson et al.

(10) Patent No.: US 11,547,085 B2
(45) Date of Patent: Jan. 10, 2023

(54) PET FOOD CONTAINER

(71) Applicant: Doskocil Manufacturing Company, Inc., Arlington, TX (US)

(72) Inventors: Chris Wilson, Arlington, TX (US); Ron Bagley, Arlington, TX (US); Josiah Wilhelm, Columbia Station, OH (US); Sunil Pinto, Arlington, TX (US)

(73) Assignee: DOSKOCIL MANUFACTURING COMPANY, INC., Arlington, TX (US)

( * ) Notice: Subject to any disclaimer, the term of this patent is extended or adjusted under 35 U.S.C. 154(b) by 455 days.

(21) Appl. No.: 16/715,875

(22) Filed: Dec. 16, 2019

(65) Prior Publication Data

US 2020/0196567 A1 Jun. 25, 2020

Related U.S. Application Data

(60) Provisional application No. 62/784,569, filed on Dec. 24, 2018.

(51) Int. Cl.
*A01K 5/01* (2006.01)
*B65D 43/02* (2006.01)

(52) U.S. Cl.
CPC ............ *A01K 5/0135* (2013.01); *B65D 43/02* (2013.01); *B65D 2543/00259* (2013.01)

(58) Field of Classification Search
CPC .... A01K 5/0142; A01K 5/0135; B65D 47/12; B65D 43/02; B65D 2543/00259
See application file for complete search history.

(56) References Cited

U.S. PATENT DOCUMENTS

| 5,680,951 | A | * | 10/1997 | Feltman, III | ....... A47G 19/2272 |
| | | | | | 220/253 |
| 2005/0115517 | A1 | | 6/2005 | Wolfe, Jr. et al. | |
| 2011/0114025 | A1 | * | 5/2011 | McMurphy | .......... A01K 5/0135 |
| | | | | | 119/51.5 |
| 2012/0325157 | A1 | | 12/2012 | Lipscomb et al. | |
| 2015/0101546 | A1 | | 4/2015 | Simon et al. | |
| 2017/0118958 | A1 | | 5/2017 | Ma et al. | |
| 2019/0000038 | A1 | * | 1/2019 | Whitney | ................ B65D 47/12 |
| 2019/0098864 | A1 | * | 4/2019 | Simon | .................. A01K 5/0135 |
| 2020/0198861 | A1 | * | 6/2020 | Finckelsen | ................ A45F 3/18 |

FOREIGN PATENT DOCUMENTS

WO 2016/036711 A1 3/2016

OTHER PUBLICATIONS

Extended European Search Report dated May 28, 2020 in corresponding European Patent Application No. 19217972.9.

* cited by examiner

*Primary Examiner* — Shawn M Braden
(74) *Attorney, Agent, or Firm* — Global IP Counselors, LLP

(57) ABSTRACT

A pet food container includes a hollow body including a top, a bottom, and an outer surface disposed between the top and the bottom. The top has a recessed portion defined by an inner longitudinal surface and recessed top surface. The recessed top surface includes an opening in communication with an interior of the hollow body and the inner longitudinal surface includes a latching mechanism configured to couple to a removable cap.

20 Claims, 16 Drawing Sheets

PET FOOD CONTAINER

CROSS-REFERENCE TO RELATED APPLICATION

This application claims benefit of U.S. Provisional Application No. 62/784,569, filed Dec. 24, 2018, the contents of which are hereby incorporated herein by reference.

BACKGROUND

Field of the Invention

The present invention relates to a pet food container that can be used to provide food to pets in a variety of different ways. More particularly, the present invention relates to a pet food container that can include a removable, lockable treat that can block an opening to provide food to pets in a variety of different ways.

Background of the Invention

There are many types of food containers and pet feeding devices including pet food containers that hold treats and allow them to be released. Many of these feeding devices attempt to provide slower feeding to pets rather than having all of the treats in a bowl where a fast eating pet has access to all of the food at once. There are also feeding devices automated to provide predetermined amounts of treats or food at predetermined time intervals.

SUMMARY

It has been discovered that improved pet food containers that can slow a pet's access to food without significant supervision from the owner or other pet provider are desired. Further, pet food containers are often covered in slobber or food remains or other detritus from the previous feeding or feedings. More aesthetically pleasing pet food containers are desired. In view of the state of the known technology, one aspect of the present disclosure is to provide a pet food container including a hollow body including a top, a bottom, and an outer surface disposed between the top and the bottom. The top has a recessed portion defined by an inner longitudinal surface and recessed top surface. The recessed top surface includes an opening in communication with an interior of the hollow body and the inner longitudinal surface includes a latching mechanism configured to couple to a removable cap.

BRIEF DESCRIPTION OF THE DRAWINGS

The invention will be explained in more detail hereinafter with reference to the drawings.

DETAILED DESCRIPTION OF THE EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
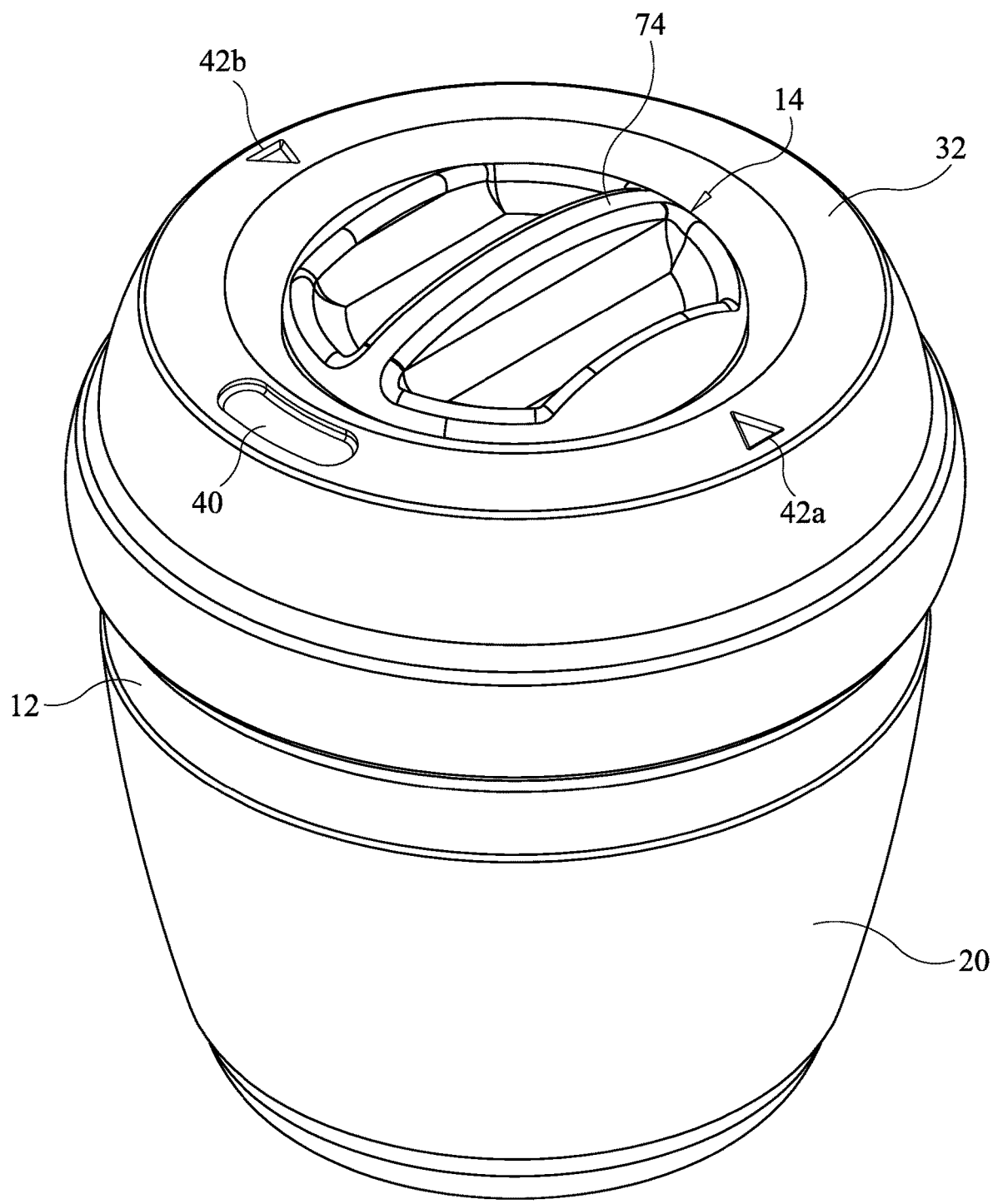
FIG. 1 is a top perspective view of a pet food container with a cap according to an embodiment of the present invention.
Figure 2:
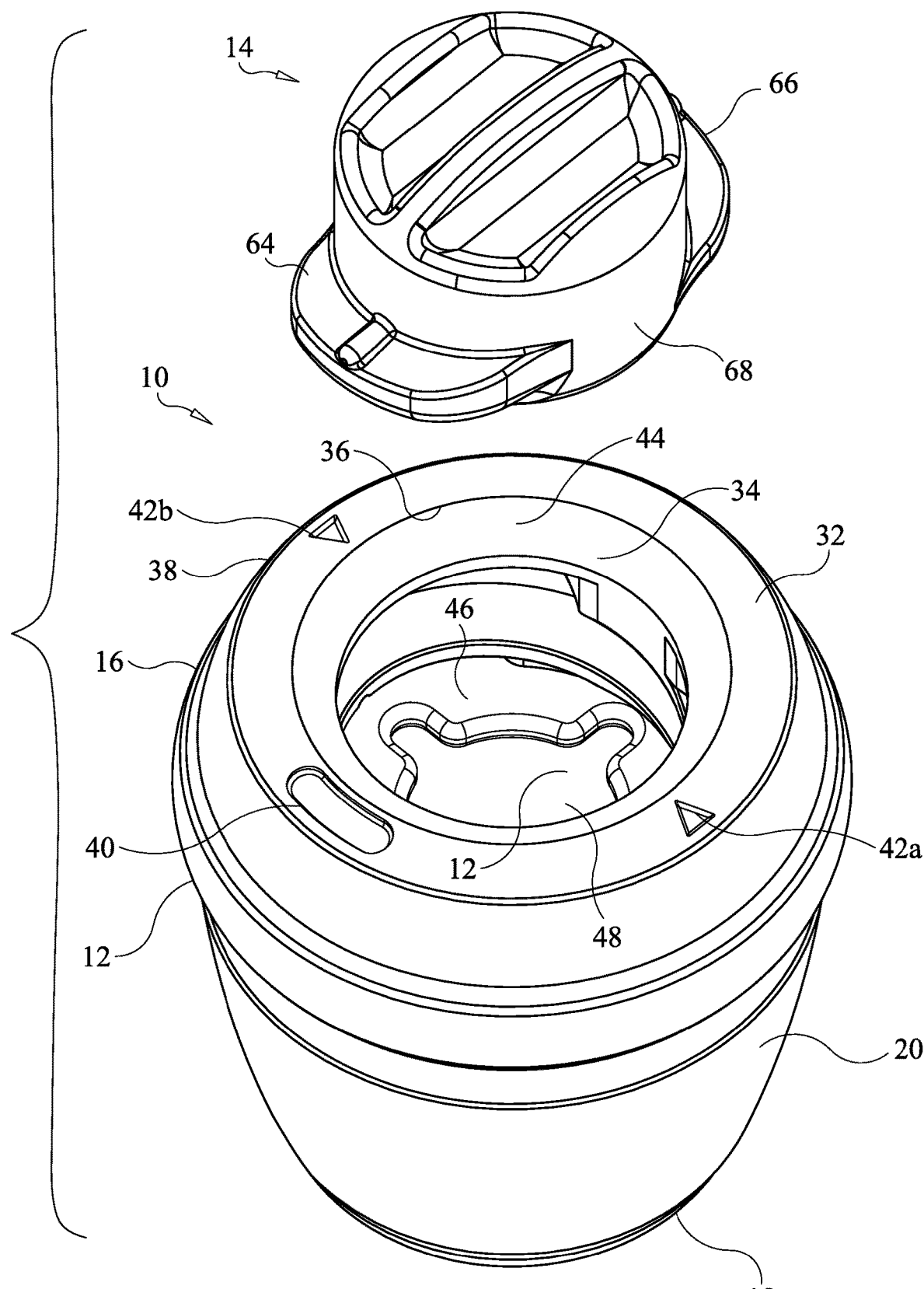
FIG. 2 is an exploded perspective view of a pet food container and cap shown in FIG. 1.

FIGS. 1 and 2 are perspective views of a pet food container 10 according to a disclosed embodiment. The pet food container comprises a body 12 and a removable cap 14. It is noted that some embodiments of the pet food container 10 can include only the body 12, but in such embodiments, the body 12 is configured to accept the cap 14, as described herein.

The body 12 can be hollow and includes a top, a bottom 18, and an outer surface 20 disposed between the top 16 and the bottom 18. The body 12 can be generally cylindrical and be in the general shape of an aesthetically pleasing object. For example, in FIGS. 1 and 2 the body 12 of the pet food container 10 is configured to look similar to a disposable or reusable travel coffee mug. The body 12 is preferably formed from plastic or other moldable material and is formed by plastic molded as is known in the art. The body 12 can include an interior 22 defined by an outer radial or circumferential surface 24. The outer radial or circumferential surface 24 of the interior 22 is preferably cylindrical, but can be any shape or configuration desired.

Figure 9:
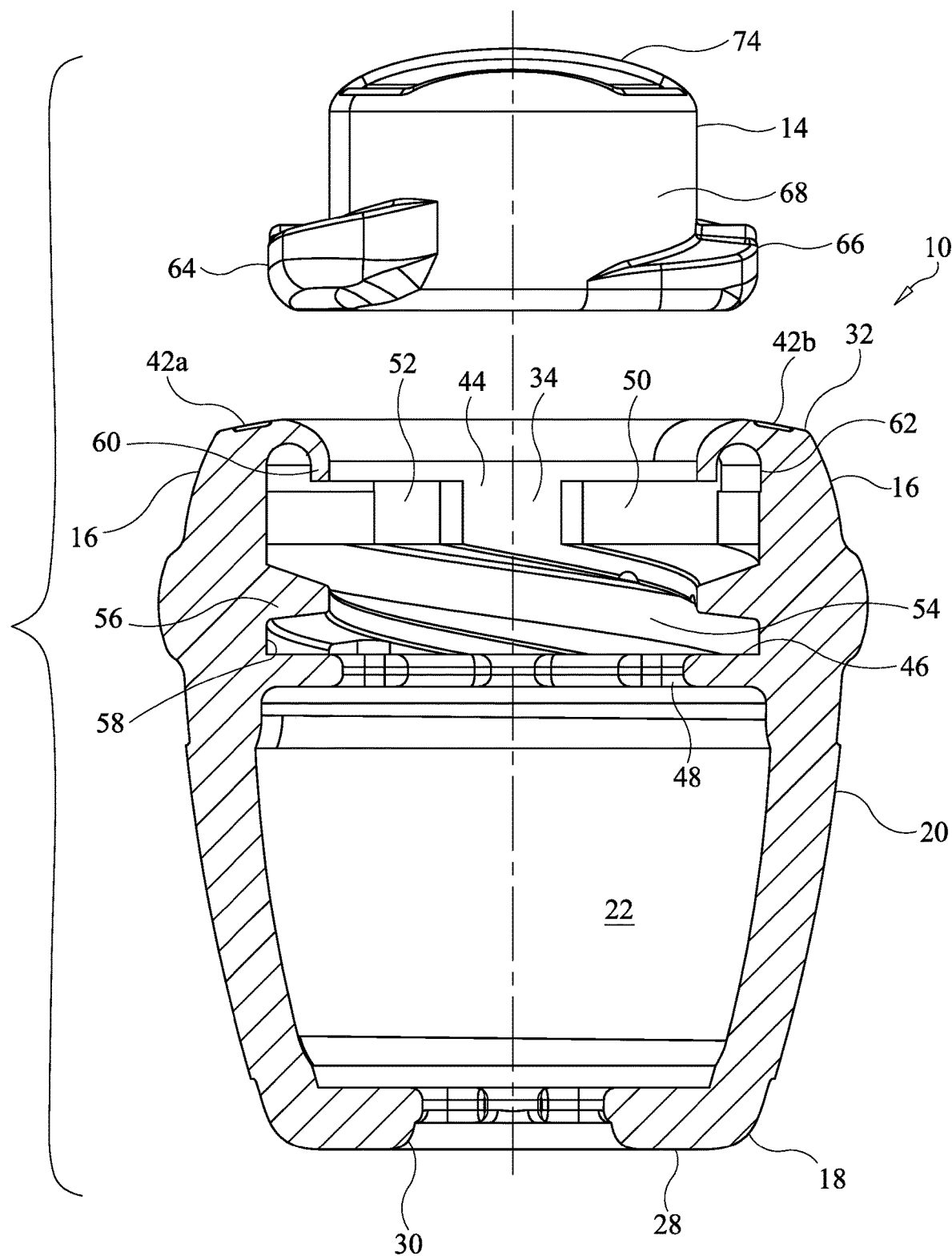
FIG. 9 is a cross sectional view of the pet food container taken along line 9-9 of FIG. 2.
Figure 10:
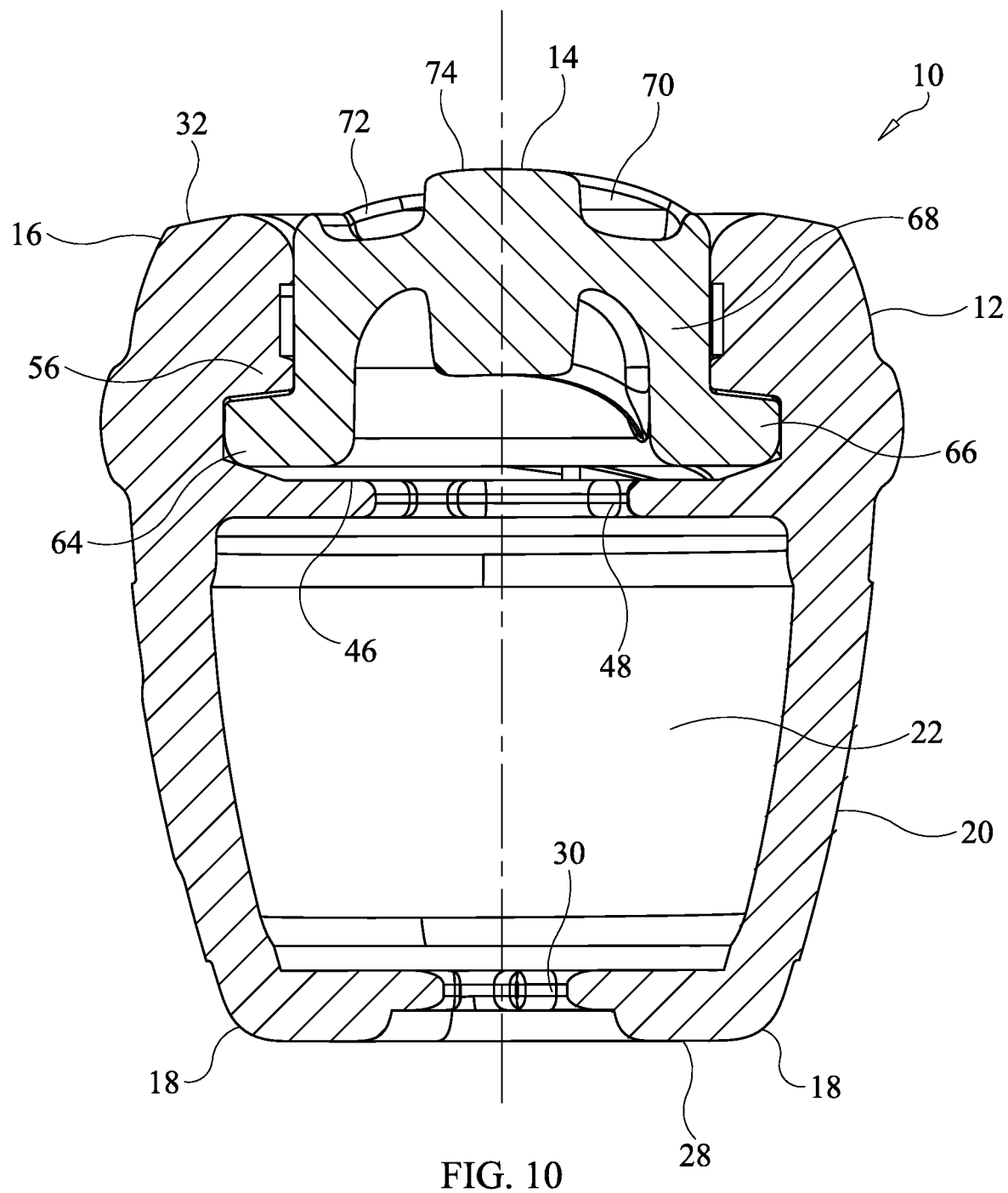
FIG. 10 cross sectional view of the pet food container taken along line 10-10 of FIG. 1.
Figure 11:
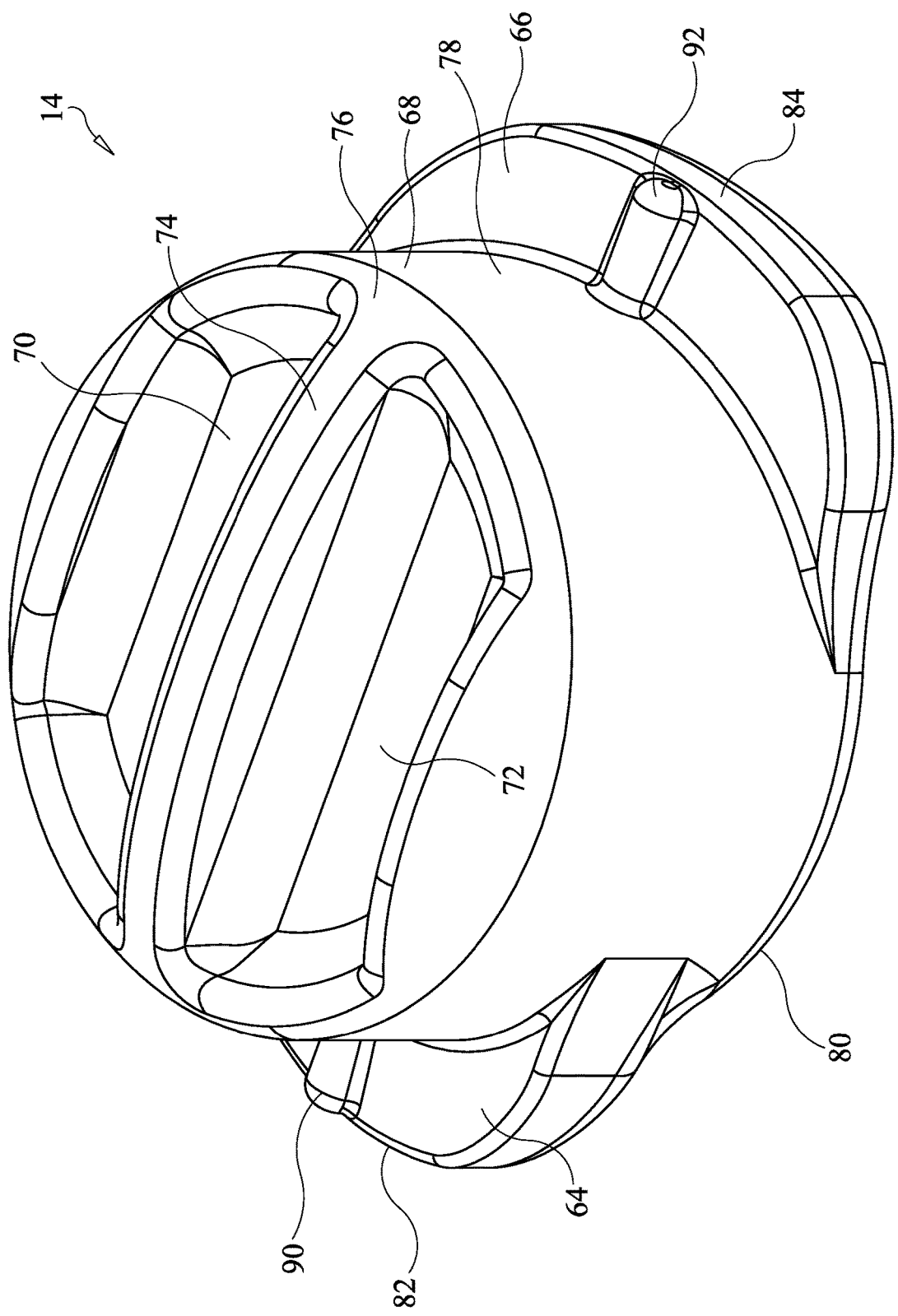
FIG. 11 is a top perspective view of the cap shown in FIG. 2.
Figure 12:
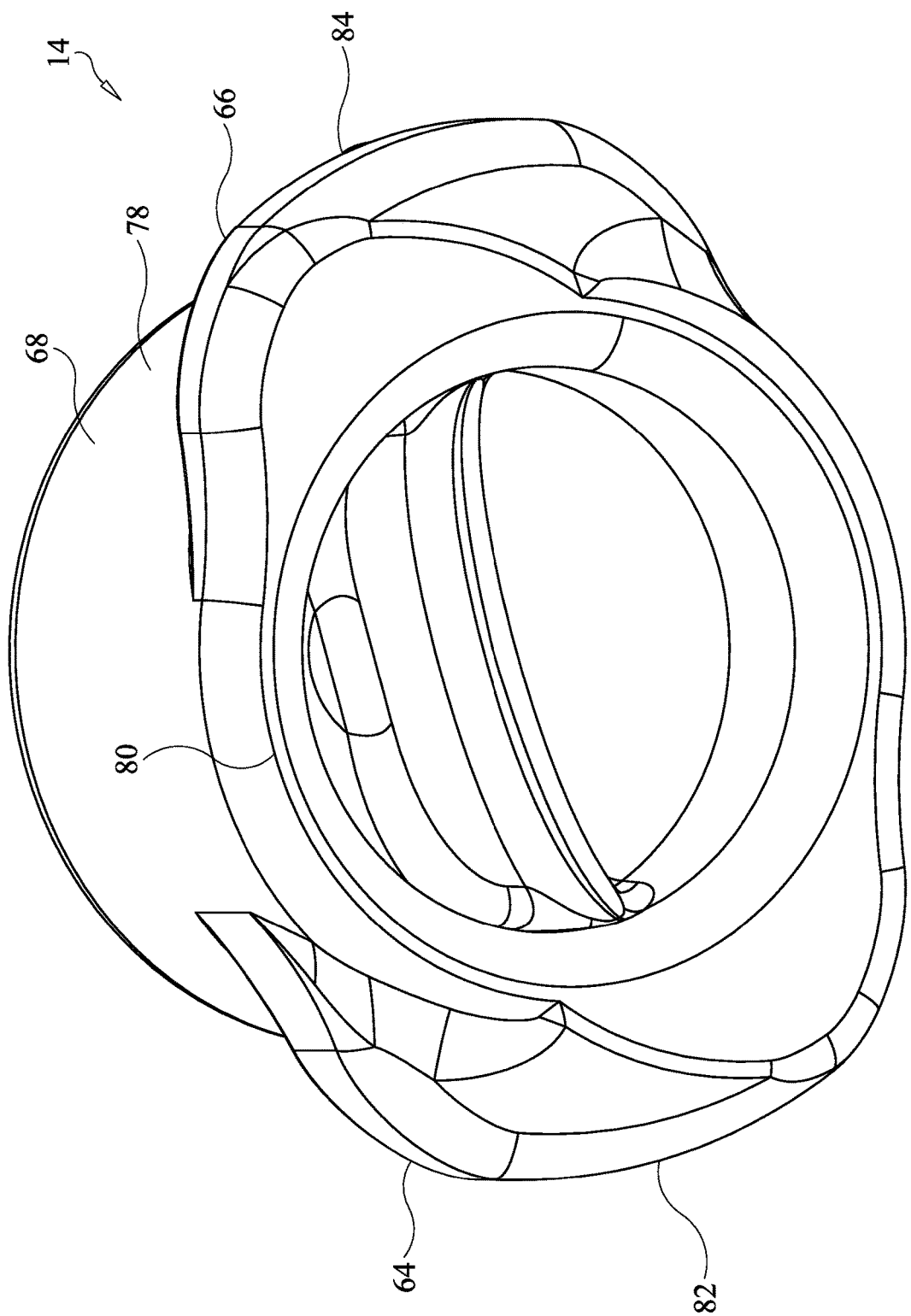
FIG. 12 is a bottom perspective view of the cap shown in FIG. 11.

The outer surface 20 is arcuate due to the cylindrical configuration of the body 12 and is generally smooth. A radial protrusion extends in a position closer to the top 16 than the bottom 18. The radial protrusion 26 preferably is configured to enable the top 16 of the body 12 to appear as a domed coffee lid. However, as can be seen in FIGS. 9 and 10, preferably the entire body 12 is unitarily formed as a one piece molded element.

Figure 4:
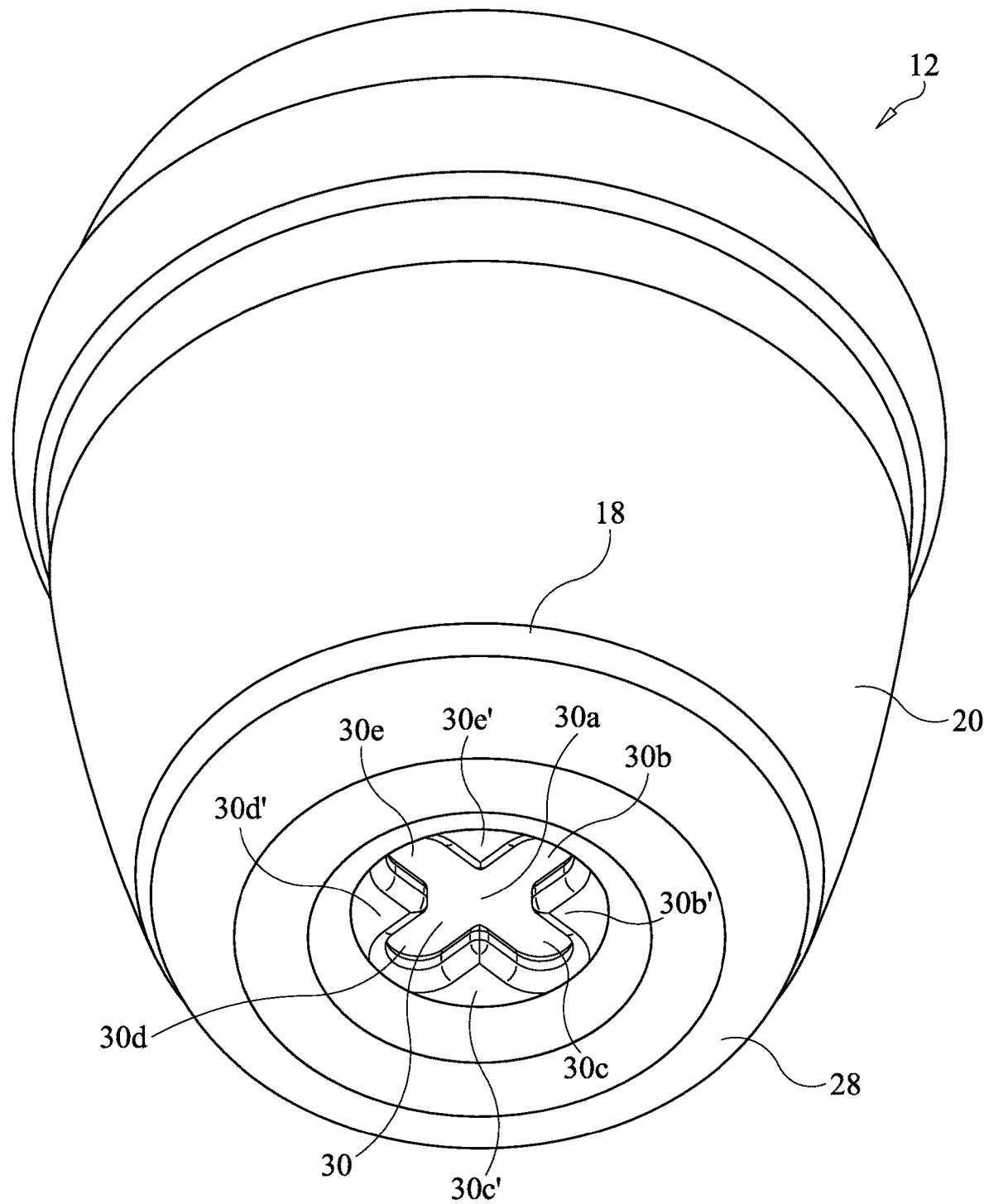
FIG. 4 is a bottom perspective view of the pet food container shown in FIG. 3.
Figure 5:
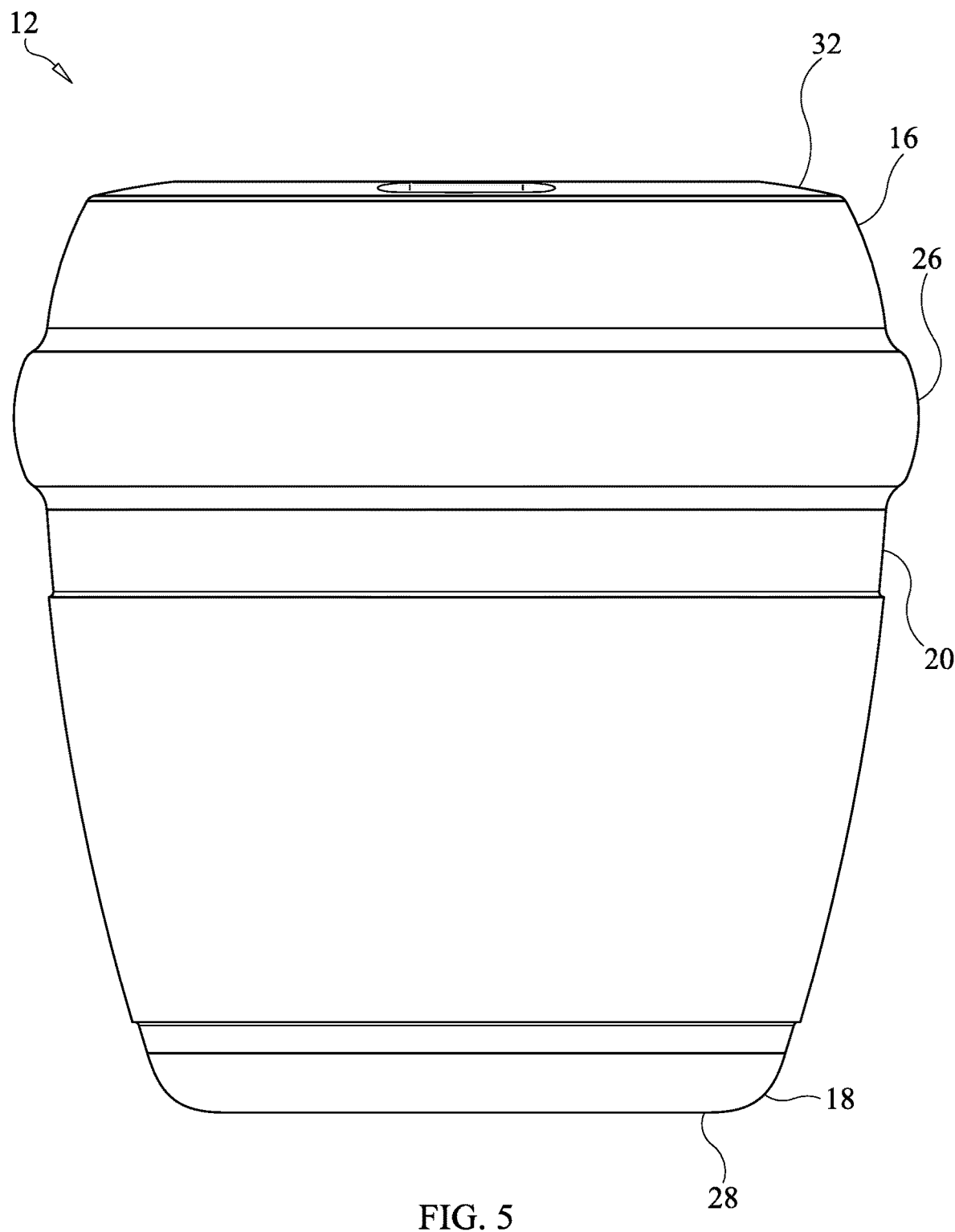
FIG. 5 is a side view of the pet food container shown in FIG. 3.
Figure 7:
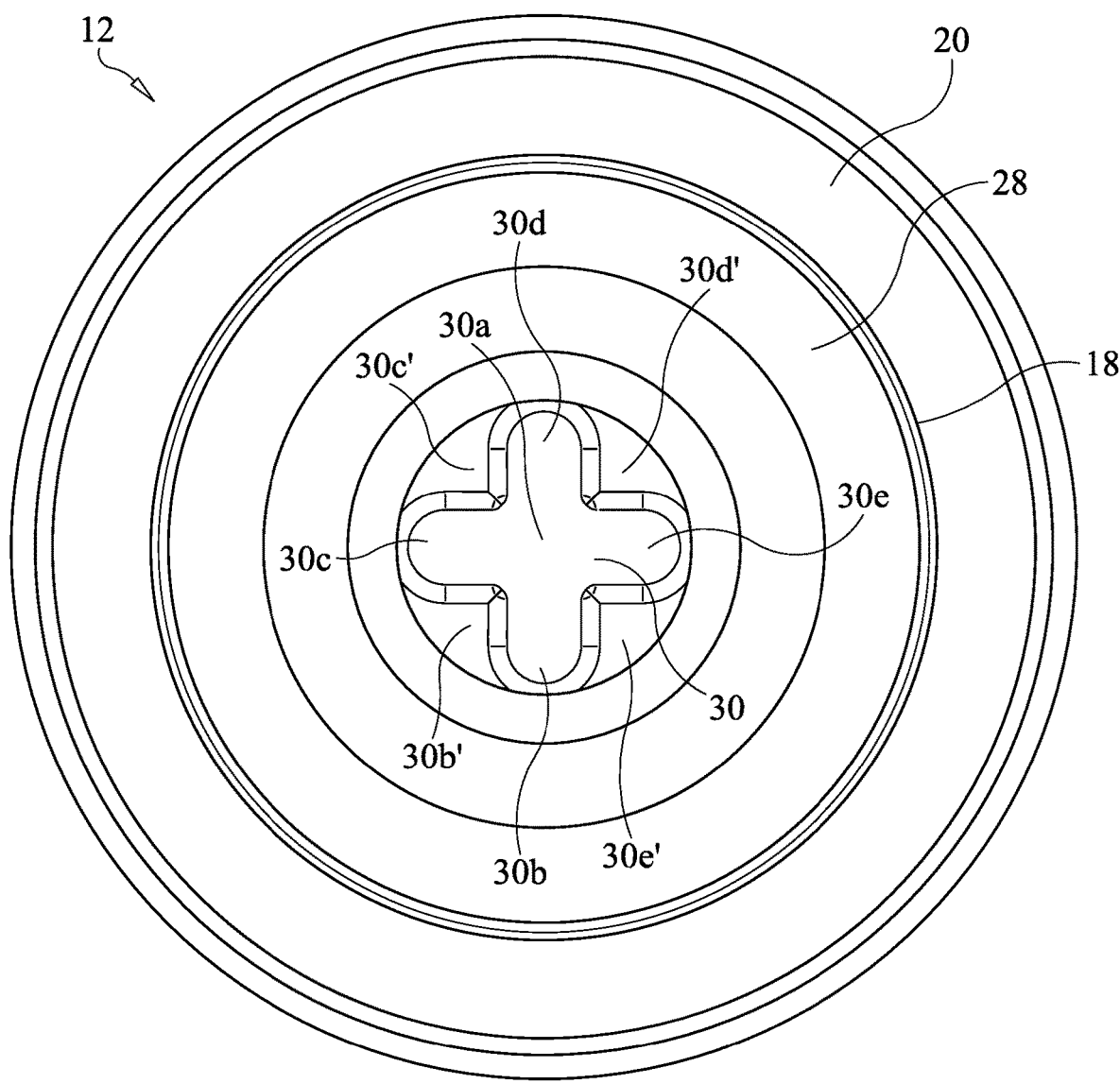
FIG. 7 is a bottom view of the pet food container shown in FIG. 3.
Figure 8:
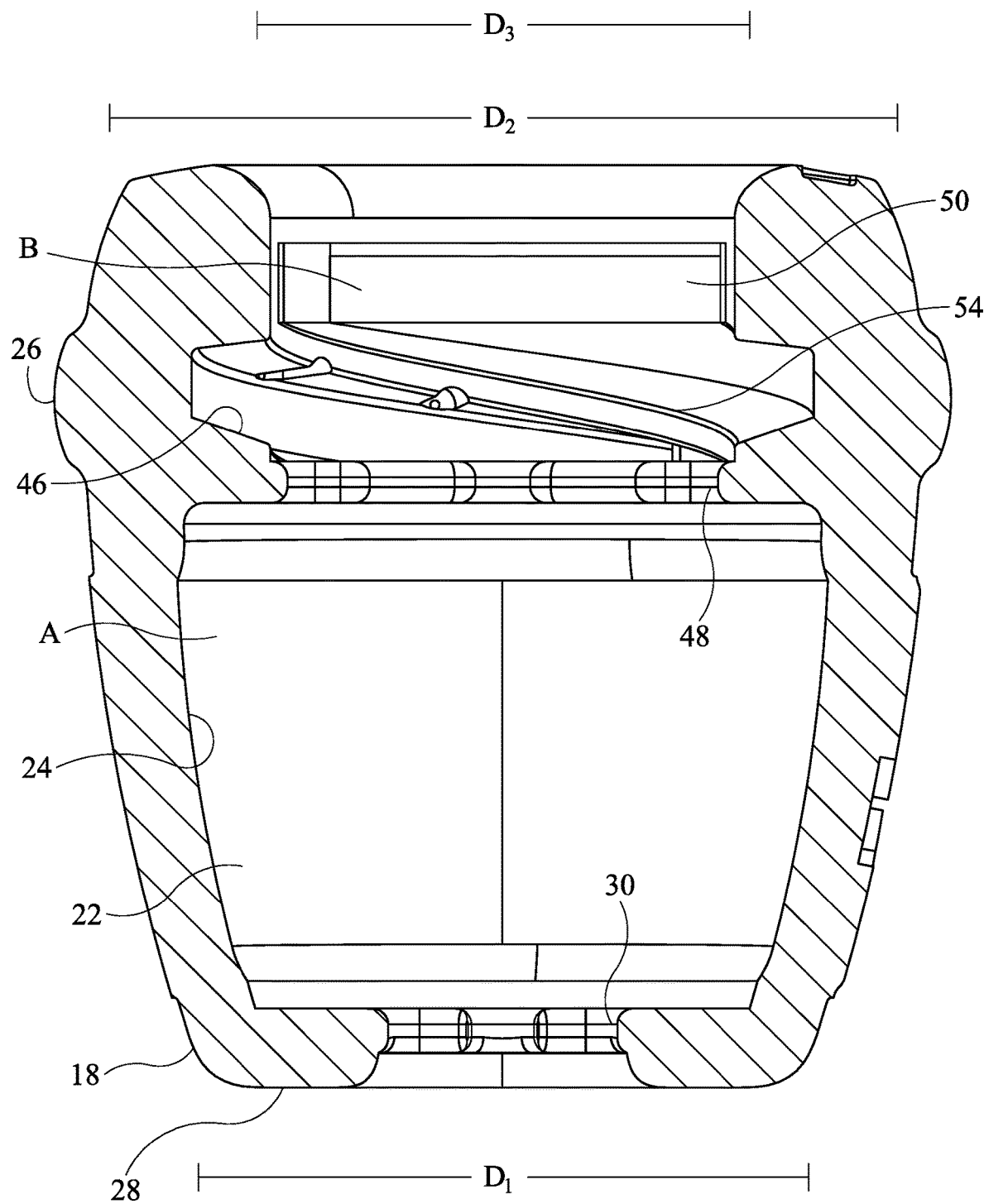
FIG. 8 is a cross sectional view of the pet food container taken along line 8-8 of FIG. 6.

As shown in FIGS. 4, 7 and 8, the bottom 18 includes a bottom surface 28. The bottom 18 preferably has a diameter $D_1$ that is less than the diameter $D_2$ of the top 16 and joins with the outer surface 20. The bottom surface 28 can have an opening 30 therein. The opening 30 is in communication with the interior 22 of the body 12 and can have any suitable shape. In one embodiment, the opening can be a plus sign. That is, the opening can have a central portion 30a and four (4) radial extensions 30b-e extending from the central portion 30a that are offset from each other by about 90 degrees. Such a configuration enables an object to be inserted through the opening 30 and into the interior 22 of the body 12. That is, the four (4) protrusions or radial extensions 30b-e enable the edges 30b'-e' adjacent the central portion 30a of the opening 30 to flex and thereby expand the central portion 30a, enabling relatively large objects to pass through the opening 30. The edges 30b'-e' can then flex back to their original position, thereby preventing the object from easily passing through the opening 30 and out of the interior 22 of the body 12. However, it is noted that the opening 30 can be sized and configured in any manner desired, or the bottom surface 28 can have no opening therein and be a continuous surface. In one embodiment, the opening 30 is sized and configured to have an animal foodstuff or treat pass therethrough and into the interior 22 of the body 12.

Figure 3:
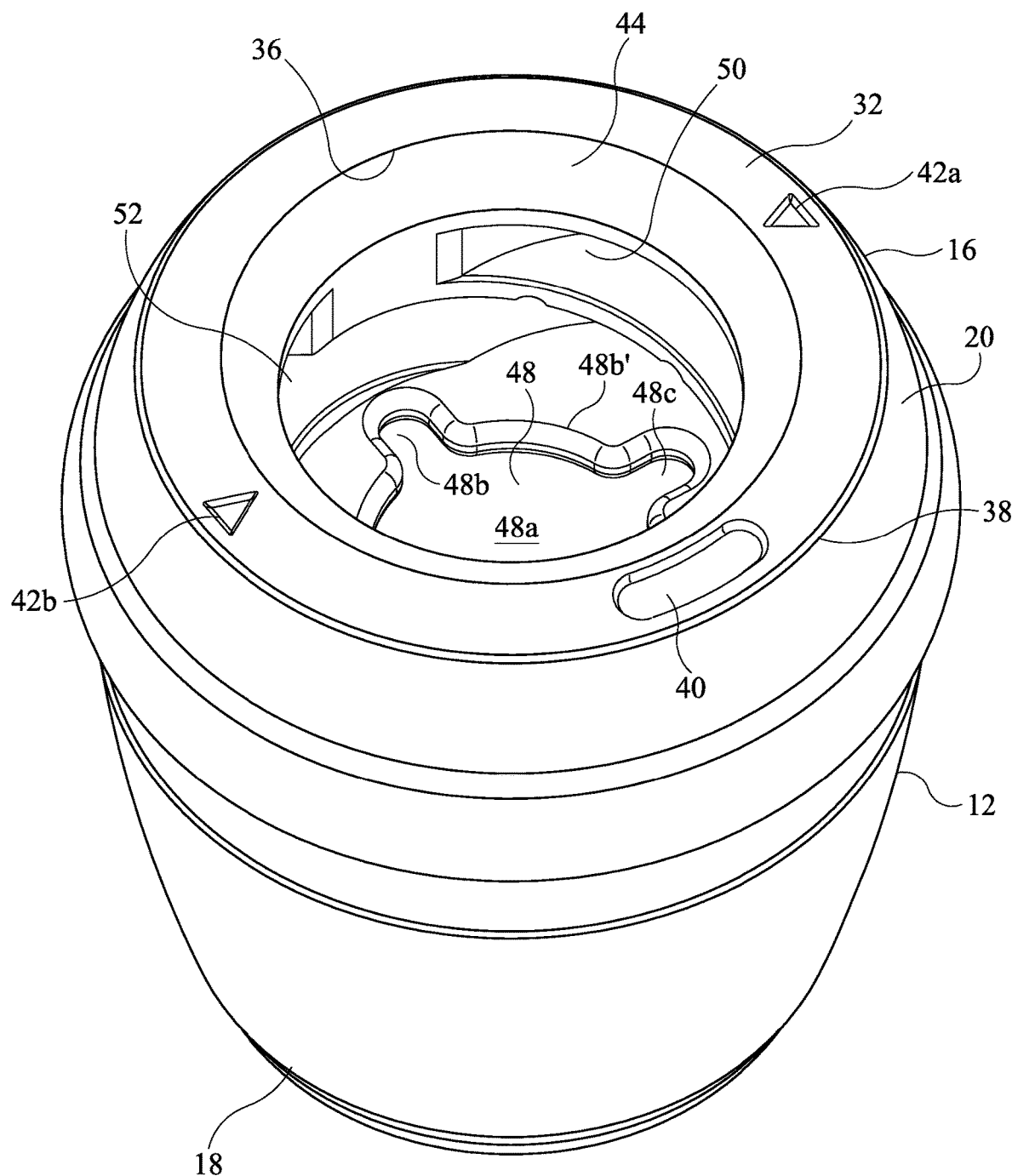
FIG. 3 is a top perspective view of the pet food container of FIG. 2 with the cap removed.
Figure 6:
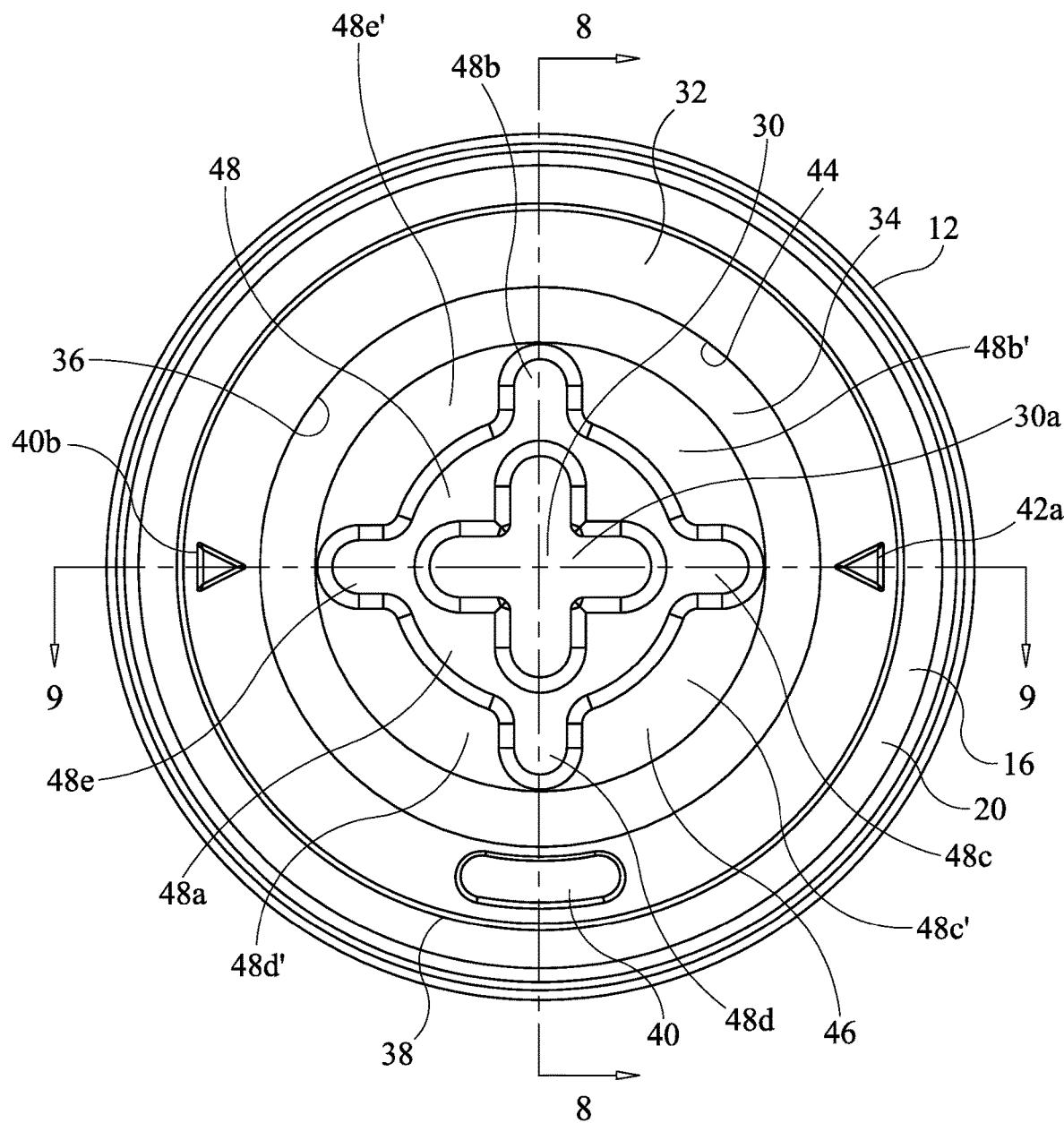
FIG. 6 is a top view of the pet food container shown in FIG. 3.

A shown in FIGS. 3, 6 and 8, the top 16 includes a top surface 32 and a recessed portion 34. The top surface 32 is generally cylindrical and extends around the recessed portion 34. The top surface 32 has a diameter $D_2$ that is preferably larger than the diameter $D_1$ of the bottom surface 28. The top surface 28 is a ring-shaped surface the extends from the outer periphery 36 of the recessed portion 34 to the edge 38 of the top 16. The top surface 32 joins with the outer surface 20 at the edge 38.

The top surface 32 can have a first elliptical recess 40. The first elliptical recess 40 corresponds to and reflects the opening in a disposable or reusable coffee mug. The top surface 32 can also have second and third protrusions 42a and 42b that are offset 90 degrees from the first recess 40 and oppose each other. That is, the second and third recesses 42a and 42b are positioned 180 degrees from each other. It is noted that the top surface 32 can have any number (including none) and shape of recesses in an attempt to resemble a disposable or reusable coffee mug or other type of cup or drinking apparatus.

The recessed portion 34 is defined by an inner longitudinal surface 44 and a recessed top surface 46. The recessed top surface 46 can be generally circular with an opening 48 extending therethrough and acts as a divider between the recessed portion and the interior 22 of the body 12. In other words, the recessed top surface 46 can be part of a divider that defines an upper limit of the interior 22 of the body 12 and a lower limit of the recessed portion 34. Thus, as can be understood, the interior 22 of the body 12 defines a first compartment A and the recessed portion 24 defines a second compartment B.

The opening 48 enables the recessed portion 34 to communicate with the interior 22 of the body 12. As shown FIGS. 2, 3 and 6, in one embodiment, the opening can be a plus sign. That is, the opening 48 can have a central portion 48a and four (4) radial extensions 48b-d extending from the central portion 48a that are offset from each other by about 90 degrees. Such a configuration enables an object to be inserted through the opening 48 and into the interior 22 of the body 12. That is, the four (4) protrusions or radial extensions 48b-d enable the edges 48b'-e' adjacent the central portion 48a of the opening 48a to flex and expand, thereby enabling relatively large objects to pass through the opening 48. The edges 48b'-e' can then flex back to their original position, thereby preventing the object from easily passing through the opening 48 and out of the interior 22 of the body 12. However, it is noted that the opening 48 can be sized and configured in any manner desired, or the recessed top surface 46 can have no opening therein and be a continuous surface. In one embodiment, the opening 48 is sized and configured to have an animal foodstuff or treat pass therethrough and into the interior 22 of the body 12. Additionally, the opening 48 in the recess top surface 46 can have a larger central portion 48a than the central portion 30a of the opening 30 in the bottom surface 28, as seen for example, in FIG. 6. However, the size of the openings and the relative sizes of the openings can be any size desired.

Moreover, the embodiment shown includes openings 30 and 48 that are shaped in the shape of a cross or plus, but can be any shape including but not limited to triangles, circles, squares, ellipses. Either of the openings 30 and/or 48 can be shaped aesthetically such as having the shape of an animal's paw or a silhouette of an animal's head or body, if desired. Preferably, the openings 30 and 48 are configured to enable objects to be stored in the interior 22 of the body 12.

The inner longitudinal surface 44 has first and second openings or recessed portions 50 and 52. The first and second openings 50 and 52 in the inner longitudinal surface 44 allow access to spiral configuration 54 in the inner longitudinal surface 44. The spiral configuration 54 is generally similar to threads. That is, as shown in FIGS. 8 and 9, the first and second openings 50 and 52 are at an upper most part of the spiral configuration 54, and the spiral configuration 54 extends radially and downwardly on the inner longitudinal surface 44 toward the recessed top surface 46. As can be seen in FIG. 9, the threads of the spiral configuration 44 form an inwardly extending protrusion 56 and groove 58 that each extend radially and downwardly on the inner longitudinal surface 44 toward the recessed top surface 46. The inner longitudinal surface 44, at least in part, is defined by a lip 60 that curves from the top surface 32 in a downward direction toward the recessed top surface 46, forming a radial cavity 62 at the top of the recessed portion 34. This lip 60 is capable of being flexed radially outwardly, thus enabling an object to be inserted into the recessed portion 34. Once the object has passed the lip 60 and is seated or enters the recessed portion 34, the lip 60 is capable of flexing back (i.e., radially inwardly) to an original position. The elements of the inner longitudinal surface 44 (i.e., first and second openings 50 and 52, the spiral configuration 54 and/or the lip 60) can act as a latching or locking mechanism when an object is positioned within the recessed portion 34. Thus, as can be understood, the latching mechanism can be a recess in the inner longitudinal surface 44.

As can be understood, embodiments of the present invention are configured to receive a treat (or other object or substance) either into the interior 22 of the body 12 and/or into the recessed portion 34. The treats (or other object or substance) can be positioned into the interior 22 of the body 12 through the opening 30 in the bottom surface 28 and/or the opening 48 in the recessed top surface 46. The treats that can be released through the opening 30 in the bottom surface 28 and/or the opening 48 in the recessed top surface 46 by shaking, rolling, or moving the pet food container 10.

FIGS. 9 and 10 are cross sectional side views of the pet food container 10 and an edible cap 14 according to a disclosed embodiment. The edible cap 14 is shaped to be inserted into the pet food container 10 and locked into place to make it more difficult for a pet to remove the treat.

Another aspect of the present invention is the capability of the recessed portion 34 to receive the cap 14, which can be an animal foodstuff or treat. As discussed herein, the cap 14 can be configured to screw-in or otherwise lock into the pet food container 10, and at least one of the openings 30 and/or 48 allowing other treats or pet food to be stored and released from the pet food container 10. The cap 14 can lock into the recessed portion 34 such that the pet will have a hard time getting its entire jaws around the cap 14 when in the locked position. One of the openings (e.g., opening 30) can allow other treats to be released from the pet food container 10 further prolonging the feeding time and play time for the pet when the cap 14 is positioned within the recessed portion.

Moreover, the opening 30 can enable the body 12 to be "reloaded" or "loaded" with treats or other objects when the cap 14 is disposed within the recessed portion 34.

In one embodiment, locking the cap 14 into the recessed portion 34 can be achieved by screwing the cap 14 into the spiral configuration 54 or matching tabs 64 and 66 into the first and second openings 50 and 52 or by other methods of locking or releasably holding the cap 14. Locking the treat in place also prohibits pets from biting and breaking the treat into pieces. A pet is more likely to lick rather than destroy and chew the treat in this position. Therefore, having the edible cap 14 in the locked position will lead to a slower consumption of the treat.

Moreover, when the cap 14 is adjacent to or abuts the recessed top surface 46, it restricts access to the interior 22 of the body 12 through the opening in the recessed top surface 46 of the body 12. It is noted that the cap 14 can be positioned in the recessed portion 34 in any suitable manner (e.g., threads, an interference fit, snap-fit or in any other manner). The lip 60 of the inner longitudinal surface 44 can improve the connection and fit of the cap 14. That is, the lip 60 can be biased radially inwardly, which enables the diameter $D_3$ of the recessed portion 34 to be adjustable in diameter for different sized treats or if the treat is partially eaten or deteriorated. The lip 60 can be biased radially outwardly to channel the cap 14 into the top 16 of the body 12, and the lip 60 can act as a friction fit to hold the cap 14 into place. The cap 14 can then be locked into place by additionally securing by screwing in the cap 14. It is noted that in one embodiment, the cap 14 can be configured to enable the lip 60 to flex radially inwardly to extend over the top surface of the cap 14 and hold the cap 14 securely in place.

The cap 14 can be entirely edible or can be a reusable base cap made of rubber or plastic or metal or other material known in the art. The cap 14 can be covered or filled with food or other attractants such as catnip. The cap 14 is preferably has a generally circular body 68 with the tabs 64 and 66 extending therefrom. The tabs 64 and 66 can be protrusions or threads enable the cap 14 to engage with or connect to the first and second openings 50 and 52 and the spiral configuration 54 in the recessed portion 34.

As shown in FIG. 10-16 the cap 14 can be inserted into the pet food container 10 and locked into place. In an embodiment of the pet food container 10, the pet food container 10 can also be configured to not fully lock the shaped pet treat and instead to allow release of the pet treat at a certain time interval or pressure level.

The cylindrical body 68 can be generally hollow and include two recesses 70 and 72 on the top surface, which define a radially extending protrusion 74. The radially extending protrusion 74 preferably extends through the center of the top surface 76 of the cylindrical body 68 and can be used as a handle to rotate the cap 14 into the recessed portion 34.

In this illustrated embodiment, the tabs 64 and 66 can be a plurality of protrusions which includes a first protrusion (e.g., 64) and a second protrusion (e.g., 66). The first and second tabs 64 and 66 preferably extend radially outwardly transverse to the outer surface 78 of the cylindrical body 68. Moreover, the tabs 64 and 66 preferably extend adjacent the bottom 80 of the cylindrical body 68 and in radially opposite directions. Thus, as can be understood, the tabs 64 and 66 are diametrically opposed to each other and extend at approximately 180 degrees from each other.

Figure 13:
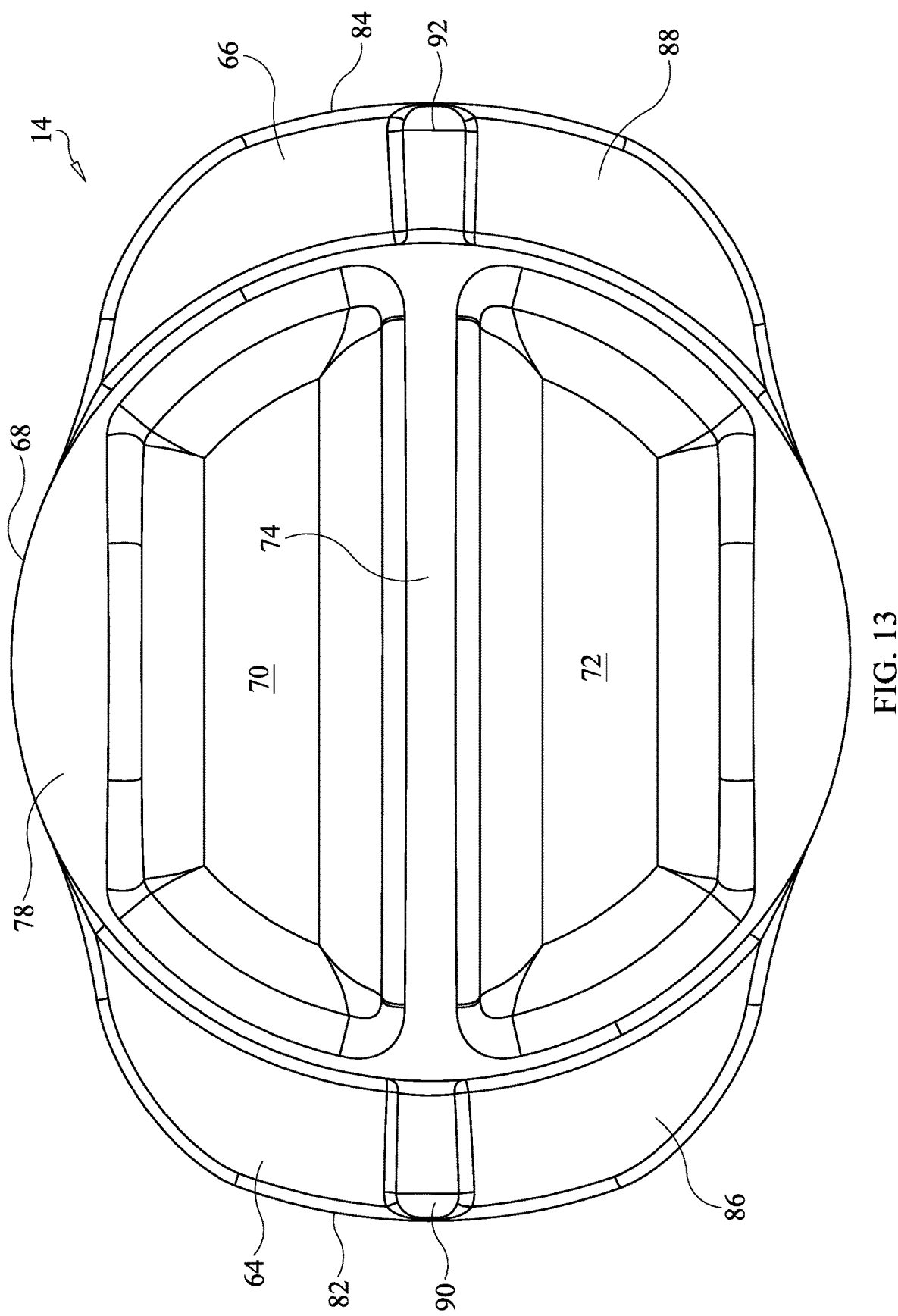
FIG. 13 is a top view of the cap shown in FIG. 11.
Figure 14:
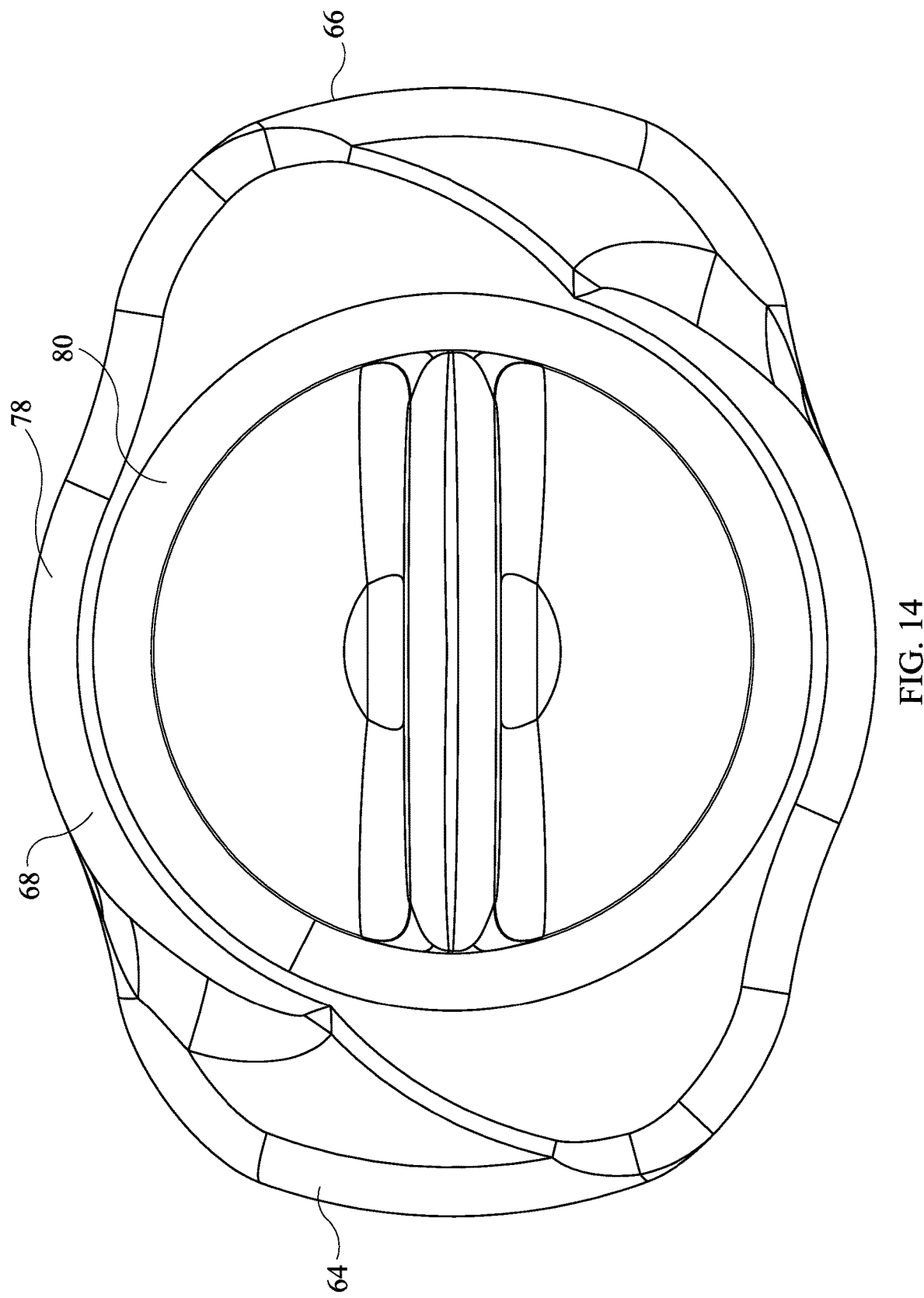
FIG. 14 is a bottom view of the cap shown in FIG. 11.
Figure 15:
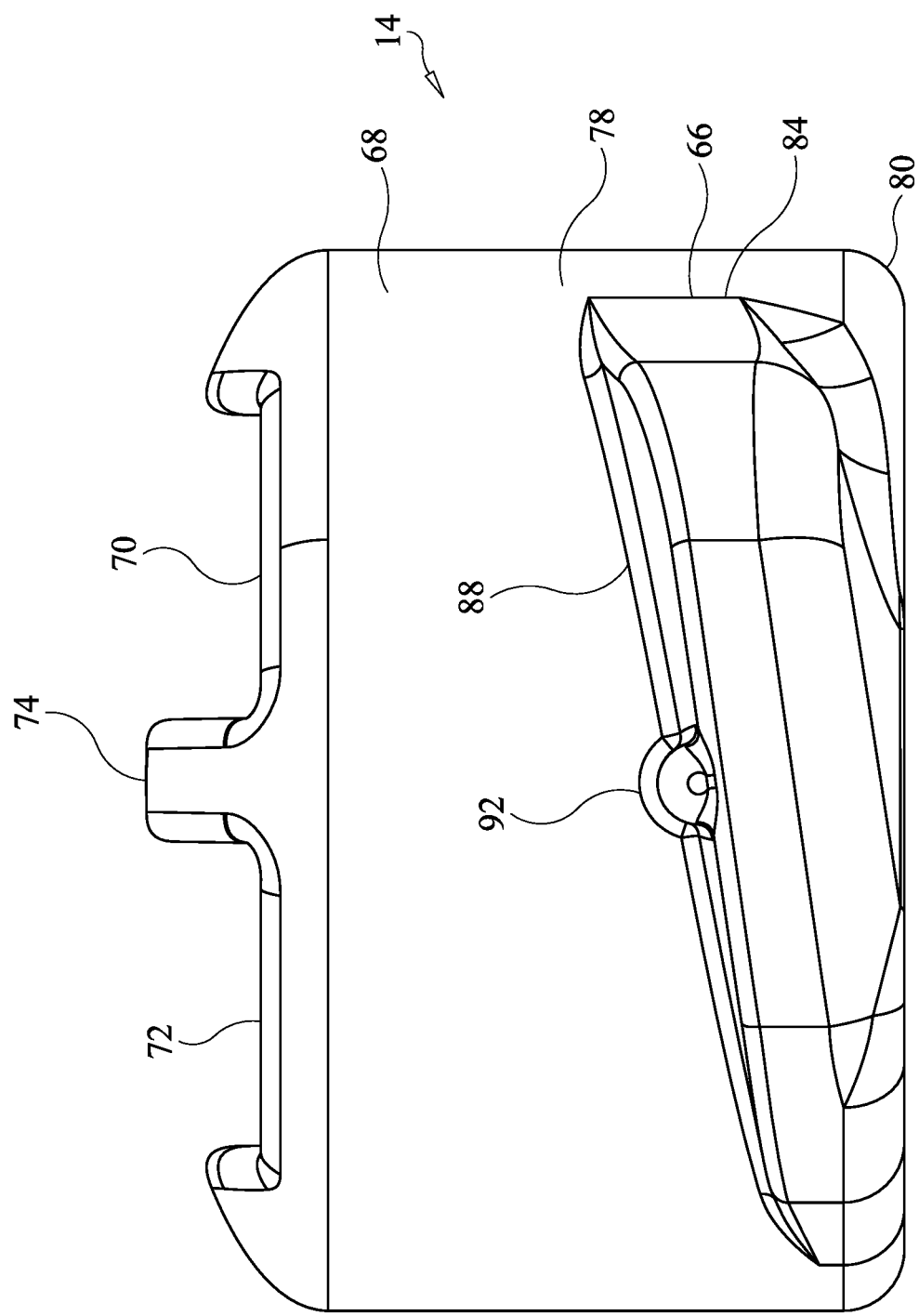
FIG. 15 is a side view of the cap shown in FIG. 11.
Figure 16:
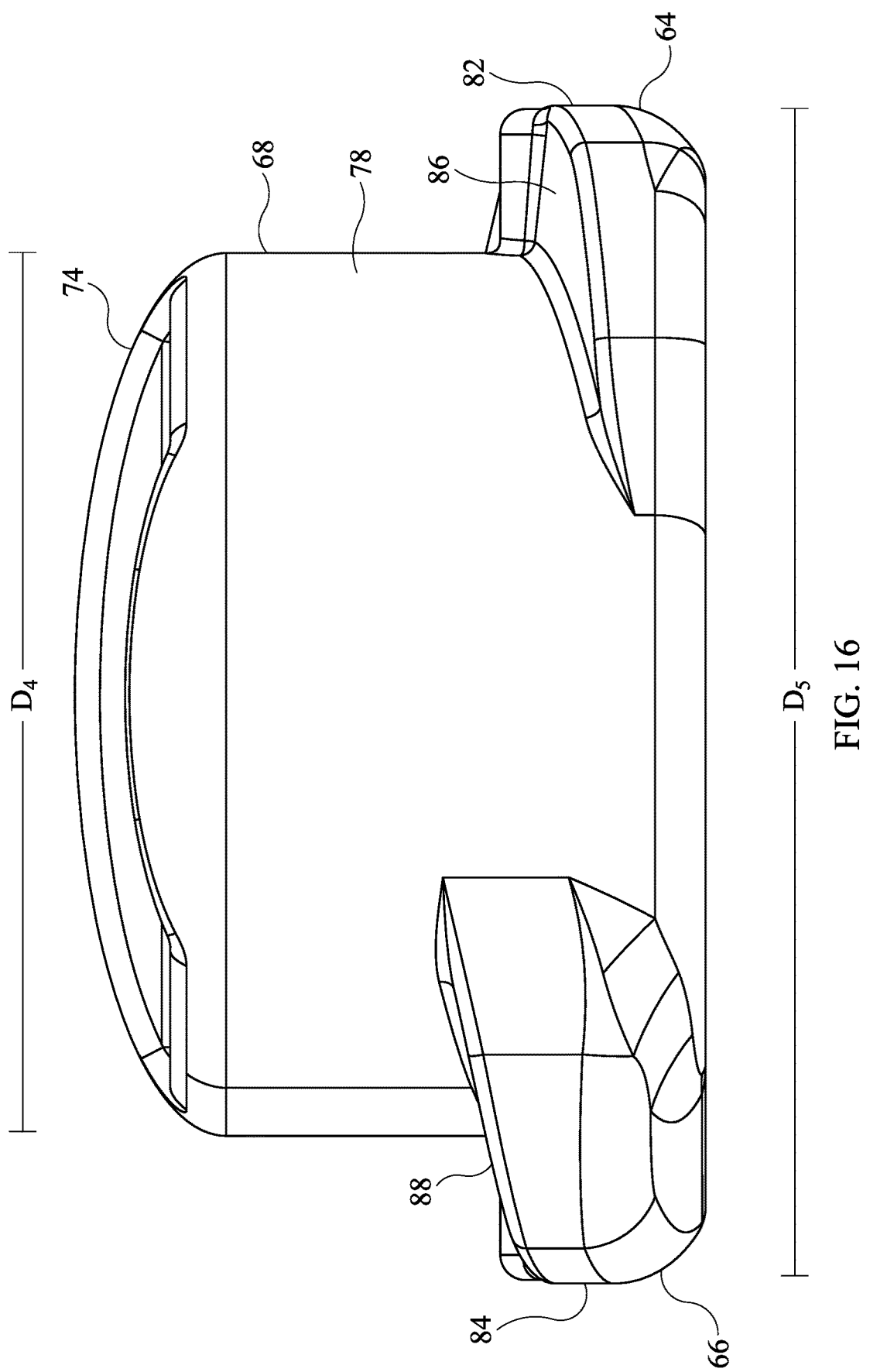
FIG. 16 is a side view of the cap shown in FIG. 11.

As shown in FIG. 13, the tabs 64 and 66 are generally mirror images of each other and have a diameter $D_5$ that is less than the diameter $D_4$ of the cylindrical body 68. The outer edges 82 and 84 of the tabs 64 and 66 are curved to facilitate insertion into the first and second openings 50 and 52 of the inner longitudinal surface 44. Further, as illustrated in FIGS. 14-16, the tabs 64 and 66 have slanting surfaces 86 and 88 that extend in the direction from the top surface 76 of the cylindrical body 68 toward the bottom 80 of the cylindrical body 68. These slanting surfaces 86 and 88 act as threads when engaged with the spiral configuration 54 in the inner longitudinal surface 44 to lock the cap 14 into position. The tabs 64 and 66 can each have radial protrusion 90 and 92 thereon that facilitates frictionally holding the cap 14 into place when positioned within the spiral configuration. These protrusions 90 and 92 preferably are disposed generally in the center of the tabs 64 and 66 and extend from the outer surface 78 of the cylindrical body 68 to the distal end (or edges 82 and 84) of the tabs 64 and 66.

When positioning the cap 14 within the recessed portion 34, as shown in FIGS. 9 and 10, the tabs 64 and 66 of the cap 14 are inserted into the first and second openings 50 and 52 of the recessed portion 34. The outer surface 78 of the cylindrical body 68 forces the lip 60 outwardly, and the lip 60 helps centrally positioning the cap 14 within the recessed portion 34. The protrusion 74 of the top surface 76 of the cylindrical body 68 is gripped and a rotational force is applied thereto. The tabs 64 and 66 engage the spiral configuration 54 (e.g., the protrusion 56) and the slanting surfaces 86 and 88 of the tabs 64 and 66, along with the spiral configuration 54, causes the cap 14 to move in a longitudinal direction into the recessed portion 54 so as to be positioned adjacent the recessed top surface 46. The tabs 64 and 66 lock the cap 14 into place and the cap 14 blocks the opening 48 in the recessed top surface 46. Thus, in this embodiment the tabs 64 and 66, the first and second openings 50 and 52 in the inner longitudinal surface 44, and/or the spiral configuration 54 act as the latching mechanism. In other words, the latching mechanism can be a radial recess in the inner longitudinal surface 44 and configured to accept a protrusion on the cap 14.

As can be understood, the body 12 of the pet food container 10 can be used alone. That is, the openings 48 and 30 in the recessed top surface 46 and the bottom surface can be used to insert treats, objects or other materials into the interior 22. The pet can play with the body 12 of the pet food container 10 and attempt to eat the treats or play with the objects in the interior 22. The shape of the openings 48 and 30 can make it difficult to access the treats or objects in the interior 22, and for the treats or objects to exit the interior 22 of the body 12.

Moreover, the cap 14 can be inserted into the recessed portion 34 as described herein. The cap 14 covers the opening 48 and a pet is more likely to lick rather than destroy and chew the cap 14 in this position. Therefore, having the edible cap 14 in the locked position will lead to a slower consumption of the cap 14 (when it is a treat or edible).

In other embodiments of the pet food container 10, the cap 14 can be another component of the specific human food or food accessory mimicked by the pet food container 10. For example, in an ice cream cone shaped pet food container 10, the ice cream scoop and the ice cream cone could be separate components where one component is the cap 14 and the other is the body 12.

Thus, as can be understood, the pet food container that is described herein is an improved pet food containers that can slow a pet's access to food without significant supervision from the owner or other pet provider. Further, the pet food container that is described herein can help reduce the slobber or food remains or other detritus from previous feeding or feedings. Additionally, the pet food container that is described herein is an aesthetically pleasing pet food containers.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," or "element" when used in the singular can have the dual meaning of a single part or a plurality of parts. Also as used herein to describe the above embodiments, directional terms refer to those directions of a vehicle equipped with the pet food container. Accordingly, these terms, as utilized to describe the present invention should be interpreted relative to a vehicle equipped with the pet food container.

The term "configured" as used herein to describe a component, section or part of a device includes hardware and/or software that is constructed and/or programmed to carry out the desired function.

The terms of degree such as "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A pet food container comprising:
a hollow body including a top, a bottom, and an outer surface disposed between the top and the bottom, the top having a recessed portion defined by an inner longitudinal surface and a recessed top surface, the recessed top surface including an opening in communication with an interior of the hollow body and the inner longitudinal surface including a latching mechanism configured to couple to a removable cap,
the interior of the body defining a first compartment, the recessed portion defining a second compartment, and the recessed top surface protruding inwardly to divide the first compartment and the second compartment.

2. The pet food container of claim 1, wherein the bottom includes an opening.

3. The pet food container of claim 1, wherein the cap is formed from edible material.

4. The pet food container of claim 1, wherein the recessed top surface is part of a divider that defines an upper limit of the interior of the hollow body.

5. The pet food container of claim 1, wherein the opening is configured to enable objects to be stored in the interior of the hollow body.

6. The pet food container of claim 1, wherein the second compartment is configured to receive the removeable cap.

7. The pet food container of claim 1, wherein the latching mechanism is a recess in the inner longitudinal surface.

8. The pet food container of claim 7, wherein the recess in the inner longitudinal surface is configured to accept a protrusion on the cap.

9. The pet food container of claim 8, wherein the recess has a spiral configuration.

10. The pet food container of claim 1, wherein the hollow body is cylindrical.

11. The pet food container of claim 1, wherein the latching mechanism is a radial recess in the inner longitudinal surface and is configured to accept a protrusion on the cap.

12. The pet food container of claim 1, further comprising the cap.

13. A pet food container comprising:
a removable cap; and
a hollow body including a top, a bottom, and an outer surface disposed between the top and the bottom, the top having a cylindrical recessed portion defined by an inner longitudinal surface and recessed top surface, the recessed top surface including an opening in communication with an interior of the hollow body and the inner longitudinal surface including a latching mechanism configured to couple to the removable cap,
the interior of the body defining a first compartment, the recessed portion defining a second compartment, and the recessed top surface protruding inwardly to divide the first compartment and the second compartment.

14. The pet food container of claim 13, wherein the recessed top surface is a divider that defines an upper limit of the interior of the hollow body.

15. The pet food container of claim 13, wherein the opening is configured to enable objects to be stored in the interior of the hollow body.

16. The pet food container of claim 13, wherein the second compartment is configured to receive the removeable cap.

17. The pet food container of claim 13, wherein the removable cap is cylindrical and includes a first protrusion and a second protrusion, the first protrusion being positioned 180 degrees from the second protrusion.

18. The pet food container of claim 17, wherein the latching mechanism includes a first spiral shaped radial recess in the inner longitudinal surface configured to accept the first protrusion and a second spiral shaped radial recess in the inner longitudinal surface configured to accept the second protrusion.

19. The pet food container of claim 1, wherein the second compartment has a larger diameter than the first compartment.

20. The pet food container of claim 13, wherein the second compartment has a larger diameter than the first compartment.

* * * * *